United States Patent
Fukaumi et al.

Patent Number: 6,086,642
Date of Patent: Jul. 11, 2000

[54] FABRICATION METHOD OF SOLID ELECTROLYTIC CAPACITOR

[75] Inventors: Takashi Fukaumi; Tomohide Date; Atushi Kobayashi, all of Tokyo, Japan

[73] Assignee: NEC Corporation, Tokyo, Japan

[21] Appl. No.: 08/974,887

[22] Filed: Nov. 20, 1997

[30] Foreign Application Priority Data

Nov. 20, 1996 [JP] Japan ................. 8-309316

[51] Int. Cl.[7] ................. H01G 9/025
[52] U.S. Cl. ............ 29/25.03; 361/524; 361/525
[58] Field of Search .............. 361/525, 526, 361/527, 532, 533, 523; 29/25.03

[56] References Cited

U.S. PATENT DOCUMENTS 5,473,503  12/1995  Sakata et al. ............ 361/525

FOREIGN PATENT DOCUMENTS

2-288215  11/1990  Japan .
4-94110   3/1992   Japan .
5-62863   3/1993   Japan .

Primary Examiner—Olik Chaudhuri
Assistant Examiner—Ginette Peralta
Attorney, Agent, or Firm—Sughrue, Mion, Zinn, Macpeak & Seas, PLLC

[57] ABSTRACT

A fabrication method of a solid electrolytic capacitor is provided, which decreases the necessary repetition number of adhesion steps of an oxidizing agent and a monomer of a conducting polymer to a dielectric of the capacitor while keeping the coverage ratio at a satisfactorily high level. A capacitor body with an oxide layer is first immersed into an oxidizer solution at a room temperature under an atmospheric pressure. The oxidizer solution has a viscosity ranging from 100 to 500 cp at room temperature under the atmospheric pressure. Then, the oxidizer solution adhered to the oxide layer is dried to remove a solvent of the adhered solution and to leave the oxidizing agent on the oxide layer. The oxidizing agent left on the oxide layer is in solid phase at room temperature under the atmospheric pressure. The capacitor body with the oxide layer is immersed into a monomer of a conducting polymer. The monomer of the conducting polymer adhered to the oxide layer is polymerized by the oxidizer left on the oxide layer, thereby forming a layer of the conducting polymer on the oxide layer. These steps are repeated until a desired thickness of the polymer layer is accomplished.

7 Claims, 5 Drawing Sheets

FIG. 5

FABRICATION METHOD OF SOLID ELECTROLYTIC CAPACITOR

BACKGROUND OF THE INVENTION

1. Field of the Invention

The present invention relates to a fabrication method of a solid electrolyti capacitor and more particularly, to a fabrication method of a solid electrolytic capacitor using a conducting polymer (for example, polypyrrole, polythiophene, and polyaniline) as a solid electrolyte.

2. Description of the Prior Art

In recent years the electronic components have been becoming miniaturized more and more and their operation speed and operation frequency have been becoming higher and higher. To cope with this tendency, the performance or characteristic of capacitors have been required to be improved in a high-frequency region.

Typically, a chip-type solid electrolytic capacitor has a porous capacitor body or pallet, which is typically made by sintering a powder or a valve metal such as tantalum (Ta) and aluminum (Al). The porous capacitor body serves as an anode. An oxide layer of the valve metal is formed on the expanded surface of th porous capacitor body. The oxide layer serves as a dielectric. A solid electrolyte layer is formed on the oxide layer. The solid electrolyte layer serves as a cathode. An anode lead is electrically connected to the capacitor body serving as the anode. A cathode lead is electrically connected to the solid electrolyte layer serving as the cathode through an electrically-conductive layer formed on the solid electrolte layer.

The porous capacitor body, the oxide layer, the solid electrolyte layer, the electrically-conductive layer, the anode lead, and the cathode lead are encapsulated by a resin package in such a way that outer parts of the anode and cathode leads protrude from the package.

The solid electrolyte layer has a function of electrically interconnecting the cathode lead with the entire surface of the dielectric (i.e., the oxide layer) formed on the capacitor body. Therefore, from this viewpoint, it is desirable that the solid electrolyte layer is a substance having a high electrical conuctivity. On the other hand, the solid electrolyte layer needs to have a healing function for healing an electrical short due to defects in the dielectric.

Accordingly, a metal, which has a high electrical conductivity, but has no dielectric healing function, cannot be used as the solid electrolyte layer. As a result, conventionally, mangnese doxide ($MnO_2$) has been popularly used as the solid electrolyte layer, because $MnO_2$ has a property that it is transformed from an electrical conductor into an insulator due to the heat generated by a short-circuit current.

However, $MnO_2$ has a problem of a comparatively low electrical conductivity of approximately 0.1 S/cm. To solve this problem, some improved capacitors using a 7,7,8,8,-tetracyanoquinodimethine (TCQN) complex with an improved electrical conductivity as the solid electrolyte layer have been developed.

Recently, various capacitors using one of such conducting polymers as a polypyrole, polyaniline, and polythiophene as the solid electrolyte layer have been vigorously developed. This is because these conducting polymers have an electrical conductivity as high as 10 to 100 S/cm.

It is has been known that these conducting polymer layers can be generated on the oxide layer with the use of an "electrolytic polymerization" or "chemically-oxidative polymerization" process.

Figure 1:
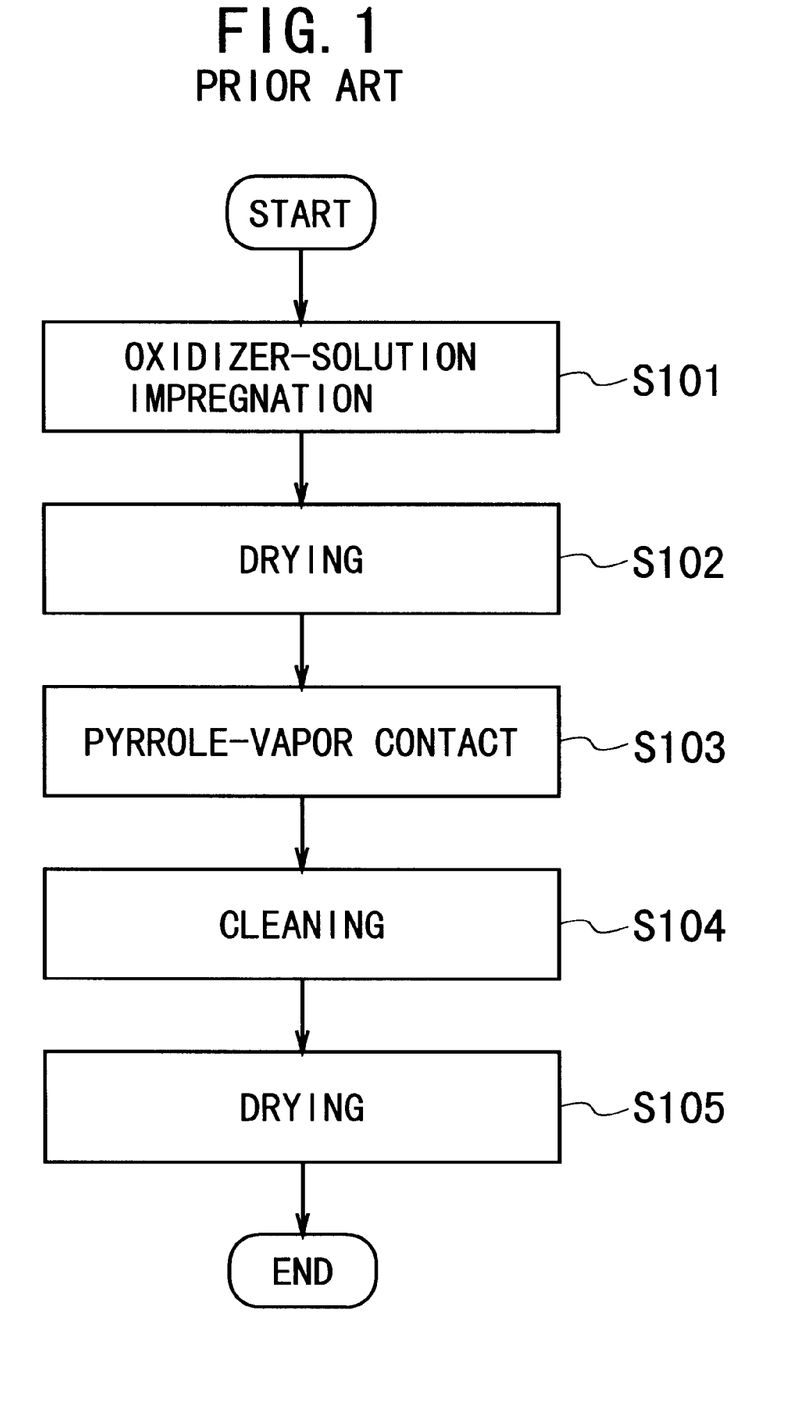
FIG. 1 is a flow chart showing the process sequence of a first example of the conventional fabrication methods of a solid electrolytic capacitor.
Figure 2:
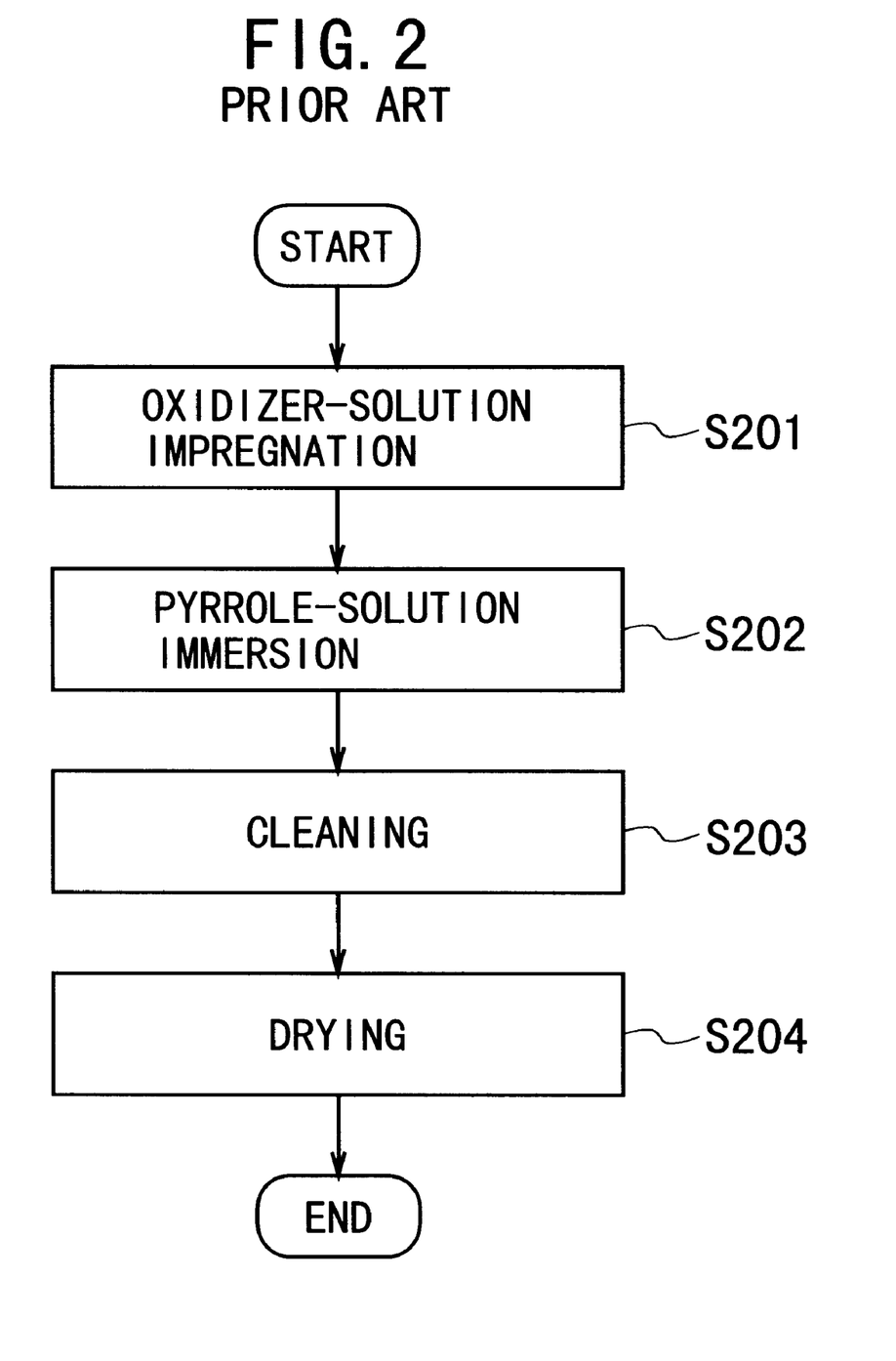
FIG. 2 is a flow chart showing the process sequence of a second example of the conventional fabrication methods of a solid electrolytic capacitor.

First and second examples of the conventional fabrication methods of the solid electrolytic capacitor using the chemically-oxidative polymerization process are shown in FIGS. 1 and 2, which is disclosed in the Japanese Non-Examined Patent Publication No. 4-94110 published in 1992.

In the first conventional example, as shown in FIG. 1, an etched aluminum foil whose surface is covered with a dielectric is impregnated with a solution of an oxidizing agent in the step S101. The impregnated solution of the oxidizing agent is then dried in step S102. Subsequently, the etched aluminum foil is exposed to or contacted with a pyrrole in vapor phase to thereby polymerize the pyrrole by chemically-oxidative polymerization due to the action of the impregnated oxidizing agent. As a result, a polypyrrole layer is formed on the dielectric of the aluminum foil in the step S103.

Following this step S103, the foil is cleaned to remove the remaining oxidizing agent and pyrrole in the step S104, and dried in the step S105. Thus, the polypyrrole layer is formed on the dielectric of the capacitor body as the conducting polymer layer.

In the second conventional example, as shown in FIG. 2, an etched aluminum foil whose surface is covered with a dielectric is impregnated with solution of an oxidizing agent in the step S201. This step S201 is the same as the step S101 in FIG. 1.

Subsequently, the etched aluminum foil is immersed into a water solution of pyrrole to thereby polymerize the pyrrole by chemically-oxidative polymerization due to the action of the impregnated oxidizing agent. As a result, a polypyrrole layer is formed on the dielectric of the aluminum foil in the step S202.

Following the step S202 the foil is cleaned to remove the remaining oxidizing agent and pyrrole in the step S203 and then, dried in the step S204. Thus, the polypyrrole layer is formed on the dielectric of the capacitor body as the conducting polymer layer.

In the steps S101 and S201, for example, a methanol solution of ferric (III) dodecylbezenesulfonate is used as the solution of the oxidizing agent. The viscosity of the oxidizing agent is set at 100 centipoise (cp) or less not to decrease the fabrication efficiency.

Figure 3:
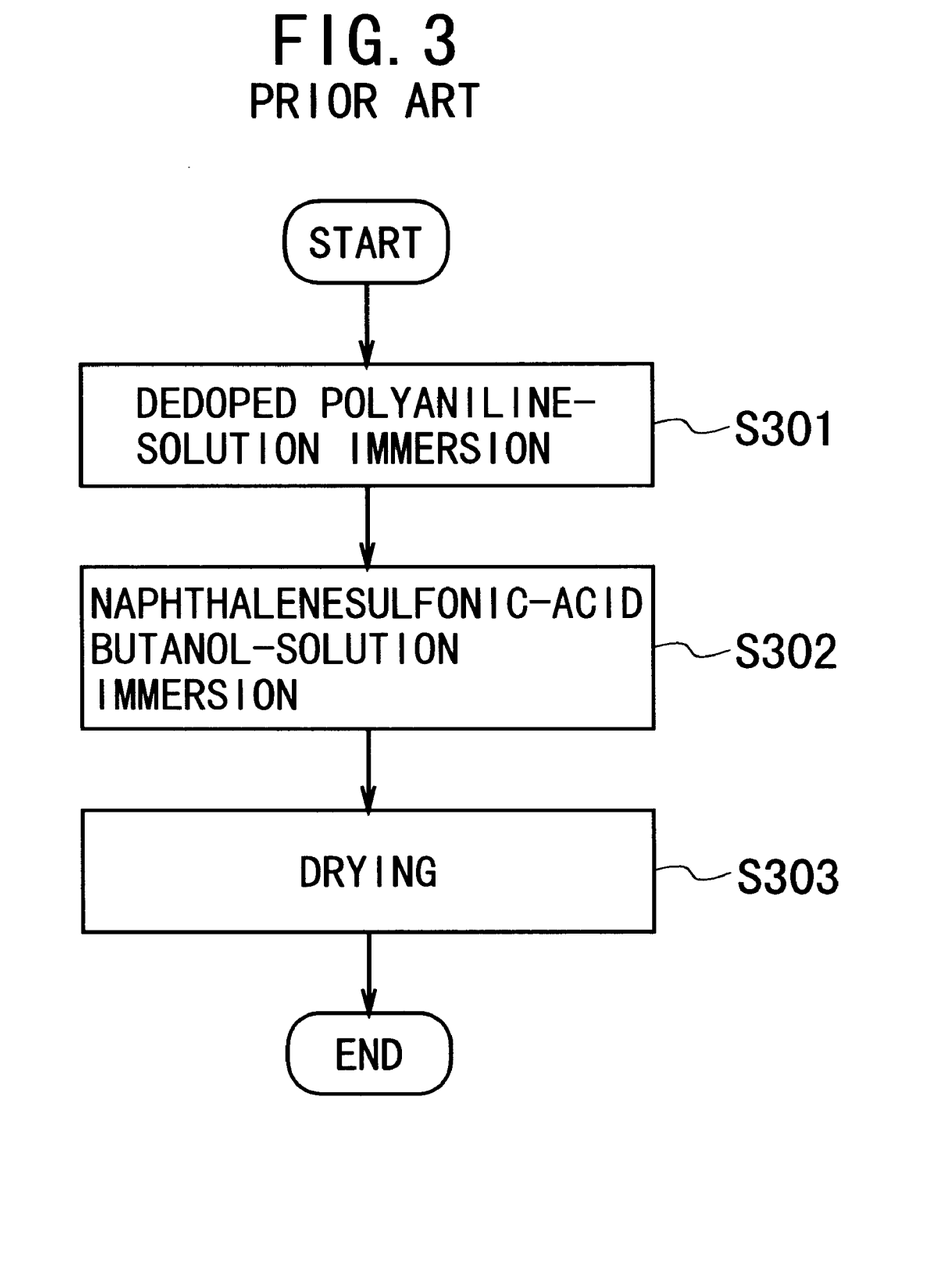
FIG. 3 is a flow chart showing the process sequence of a third example of the conventional fabrication methods of a solid electrolytic capacitor.

A third example of the conventional fabrication methods of the solid electrolytic capacitor using both the electrolytic polymerization and chemically-oxidative polymerization processes is shown in FIG. 3, which is disclosed in the Japanese Non-Examined Patent Publication No. 5-62863 published in 1993.

FIG. 3 shows only the steps of the chemically-oxidative polymerization process in the third example.

In the step S301, an etched aluminum foil whose surface is covered with a dielectric is immersed into a dedoped polyaniline solution. In the step S302, the etched aluminum foil is further immersed into a butanol solution of naphthalenesulfonic acid, thereby polymerize the dedoped polyaniline by chemically-oxidative polymerization due to the action of the impregnated oxidizing agent. Thus, an polyaniline layer is formed on the dielectric of the aluminum foil in the step S302.

In the step S303, the aluminum foil is dried to remove the remaining solutions thereon. Thus, the polyaniline layer is formed on the dielectric of the capacitor body as the conducting polymer layer.

In the step S301, the specific viscosity of the dedoped polyaniline solution is limited to be equal to or higher than 0.3 g/100 ml and lower than 0.4 g/100 ml. An electrolytic polymerization process is further performed after the chemically-oxidative polymerization process.

However, with th above-explained first and second examples of the conventional fabrication methods disclosed in the Japanese Non-Examined Patent Publication No. 4-94110, the viscosity of the solution of the oxidizing agent is set as low. Therefore, there is a problem that the necessary repetition number of the polyemrization processes becomes large to obtain a desired thickness of the conducting polymer layer. This problem is caused by the fact that the low viscosity means the low concentration of the oxidizing agent in the solution and consequently, the amount of the solid electrolyte (i.e., conducting polymer) generated in each polymerization process is small.

To decrease the necessary repetition number of the polymerization processes, the viscosity (i.e., the concentration) of the solution of the oxidizing agent needs to be raised. In this case, however, there arises another problem that the coverage ratio becomes low.

The same problem as above is applied to the third example of the conventional fabrication methods disclosed in the Japanese Non-Examined Patent Publication No. 5-62863.

SUMMARY OF THE INVENTION

Accordingly, an object of the present invention is to provide a fabrication method of a solid electrolytic capacitor that decreases the necessary repetition number of adhesion steps of an oxidizing agent and a monomer of a conducting polymer to a dielectric of the capacitor while keeping the coverage ratio at a satisfactorily high level.

Another object of the present invention is to provide a fabrication method of a solid electrolytic capacitor that improves the capacitor characteristics.

The above objects together with others not specifically mentioned will become clear to those skilled in the art from the following description.

A fabrication method of a solid electrolytic capacitor according to the present invention is comprised of the following steps (a) to (f):

In the step (a), a porous capacitor body is formed by a valve metal. The body serves as an anode of the capacitor.

In the step (b), an oxide layer of the valve metal is formed to cover the surface of the capacitor body. The oxide layer serves as a dielectric of the capacitor.

In the step (c) the capacitor body with the oxide layer is contacted with a solution of an oxidizing agent to make the solution adhere to the oxide layer at an operating temperature under an operating pressure. The solution of the oxidizing agent has a viscosity in the range from 100 cp to 500 cp at the operating temperature under the operating pressure.

In the step (d), the solution of the oxidizing agent adhered to the oxide layer is dried to remove a solvent of the adhered solution and to leave the oxidizing agent on the oxide layer. The oxidizing agent left on the oxide layer is in solid phase at the operating temperature under the operating pressure.

In the step (e), the capacitor body with the oxide layer is contacted with a monomer of a conducting polymer to make the monomer adhere to the oxide layer at the operating temperature under the operating pressure.

In the step (f), the monomer of the conducting polymer adhered to the oxide layer is polymerized by an oxidizing action of the oxidizing agent left on the oxide layer, thereby forming a layer of the conducting polymer on the oxide layer.

The above steps (c), (d), (e), and (f) are repeated until a desired thickness of the layer of the conducting polymer is accomplished.

With the fabrication method of an electrolytic capacitor according to the present invention, the capacitor body with the oxide layer is contacted with a solution of an oxidizing agent to make the solution adhere to the oxide layer in the step (d), and the solution of the oxidizing agent adhered to the oxide layer is dried to remove a solvent of the adhered solution and to leave the oxidizing agent on the oxide layer in the step (d). The oxidizing agent left on the oxide layer is in solid phase at the operating temperature under the operating pressure after the step (d).

Therefore, the oxidizing agent left on the oxide layer is difficult to close opening pores of the porous capacitor body. This means that the solution of the oxidizing agent readily enters the opening pores of the capacitor body when the step (c) is performed a second time, and that the conducting polymer is generated through polymerization of the monomer even in the opening pores of the capacitor body.

Further, since the solution of the oxidizing agent has a viscosity in a range from 100 cp to 500 cp at the operating temperature under the operating pressure, the solution of the oxidizing agent can enter the opening pores of the capacitor body without any problem. Also, the viscosity and concentration of the oxidizing agent is not excessively low.

Consequently, the necessary repetition number of adhesion steps of the oxidizing agent and the monomer of the conducting polymer to the dielectric of the capacitor until a desired thickness of the conducting polymer layer is accomplished is able to be decreased while keeping the coverage ratio at a satisfactorily high level.

Additionally, since the viscosity of the solution of the oxidizing agent is limited in the range from 100 cp to 500 cp, the ratio of the oxidizing agent and the monomer has a value near the stoichiometry. Therefore, the capacitor characteristics are improved.

The reason that the viscosity of the oxidizing agent is limited in the range from 100 cp to 500 cp is as follows.

If the viscosity of the oxidizing agent is less than 100 cp, the concentration of the oxidizing agent becomes excessively low and the ratio of the oxidizing agent and the monomer is far from the stoichiometry (i.e., the amount of the monomer is excessively large). Thus, the necessary repetition number of the steps (c), (d), (e), and (f) will be excessively large and the capacitor characteristics will degrade.

If the viscosity of the oxidizing agent is greater than 500 cp, the oxidizing agent is difficult to enter the opening pores of the capacitor body. Thus, the coverage ratio will be low.

In a preferred embodiment, the operating temperature is approximately equal to room temperature and the operating pressure is approximately equal to an atmospheric pressure. The above advantages of the present invention are effectively obtained in these temperature and pressure.

In another preferred embodiment, the operating temperature is in the range of 10 to 30 (=20±10)° C. and the operating pressure is in the range of 0.8 to 1.2 (=1.0±0.2) atm. The above dvantages of the present invention are effectively obtained in these ranges.

BRIEF DESCRIPTION OF THE DRAWINGS

In order that the invention may be readily carried into effect, it will now be described with reference to the accompanying drawings.

DETAILED DESCRIPTION OF THE INVENTION

The inventors of the present invention have made a thorough effort to solve the above problems previously described in the "Description of the Prior Art". As a result of this, they have found that a viscous coat of the oxidizing agent is formed on the surface, of the capacitor body after the drying step and that the entrances of the opening pores of the porous capacitor body are closed by the viscous coat. The coat prevents the solution of the oxidizing agent to enter the opening pores of the body, lowering the coverage ratio. The present invention having the following steps (a) to (f) was created based on the knowledge thus found.

In the step (a), a porous capacitor body is formed by a valve metal. The body serves as an anode of the capacitor.

In the step (b), an oxide layer of the valve metal is formed to cover the surface of the capacitor body. The oxide layer serves as a dielectric of the capacitor.

In the step (c), the capacitor body with the oxide layer is contacted with a solution of an oxidizing agent to make the solution adhere to the oxide layer at an operating temperature under an operating pressure. The solution of the oxidizing agent has a viscosity in the range from 100 cp to 500 cp at the operating temperature under the operating pressure.

In the step (d), the solution of the oxidizing agent adhered to the oxide layer is dried to remove a solvent of the adhered solution and to leave the oxidizing agent on the oxide layer. The oxidizing agent left on the oxide layer is in solid phase at the operating temperature under the operating pressure.

In the step (e), the capacitor body with the oxide layer is contacted with a monomer of a conducting polymer to make the monomer adhere to the oxide layer at the operating temperature under the operating pressure.

In the step (f), the monomer of the conducting polymer adhered to the oxide layer is polymerized by an oxidizing action of the oxidizing agent left on the oxide layer, thereby forming a layer of the conducting polymer on the oxide layer.

The above steps (c), (d), (e), and (f) are repeated until a desired thickness of the layer of the conducting polymer is accomplished.

In the present invention, tantalum (Ta), aluminum (Al), niobium (Nb), titanium (Ti), zirconium (Zr), magnesium (Mg), silicon (Si), or the like may be preferably used as the valve metal.

The capacitor body is typically in the form of a porous pellet. However, it may be any other form. For example, the capacitor body is formed by a rolled foil, a sintered powder, or an etched, rolled foil.

The oxide layer is typically formed by anodic oxidization of the capacitor body. However, any other process may be used.

As the oxidizing agent, a metallic aromatic sulfonate such as ferric toluenesulfonate, ferric benzenesulfonate, ferric naphthalenesulftnate, and cupric naphthalenesulfonate may be preferably used. The reason is that the advantages of the present invention are effectively obtained.

As the solvent of the oxidizing agent, alcohol such as methanol, ethanol, isopropyl alcohol, and butanol may be preferably used. The reason is that alcohol tends to vaporize at the operating temperature and operating pressure and therefore, the removal of the solvent is readily realized.

As the monomer of the conducting polymer, pyrrole, thiophene, or aniline may be preferably used. The reason is that the advantages of the present invention are effectively obtained.

The contacting step (c) with the solution of the oxidizing agent may be realized by any process such as immersion if the solution adheres to the oxide layer at the operating temperature under the operating pressure.

The drying step (d) may be realized by any drying process if the solvent of the adhered solution is removed and the oxidizing agent is left on the oxide layer.

The contacting step (e) with the monomer may be realized any process such as immersion if the monomer adheres to the oxide layer.

The polymerizing step (f) of the monomer may be realized by any polymerization process.

EXAMPLES

Preferred examples of the present invention and a comparative example will be described below referring to FIGS. 4 and 5.

FIRST EXAMPLE

Figure 5:
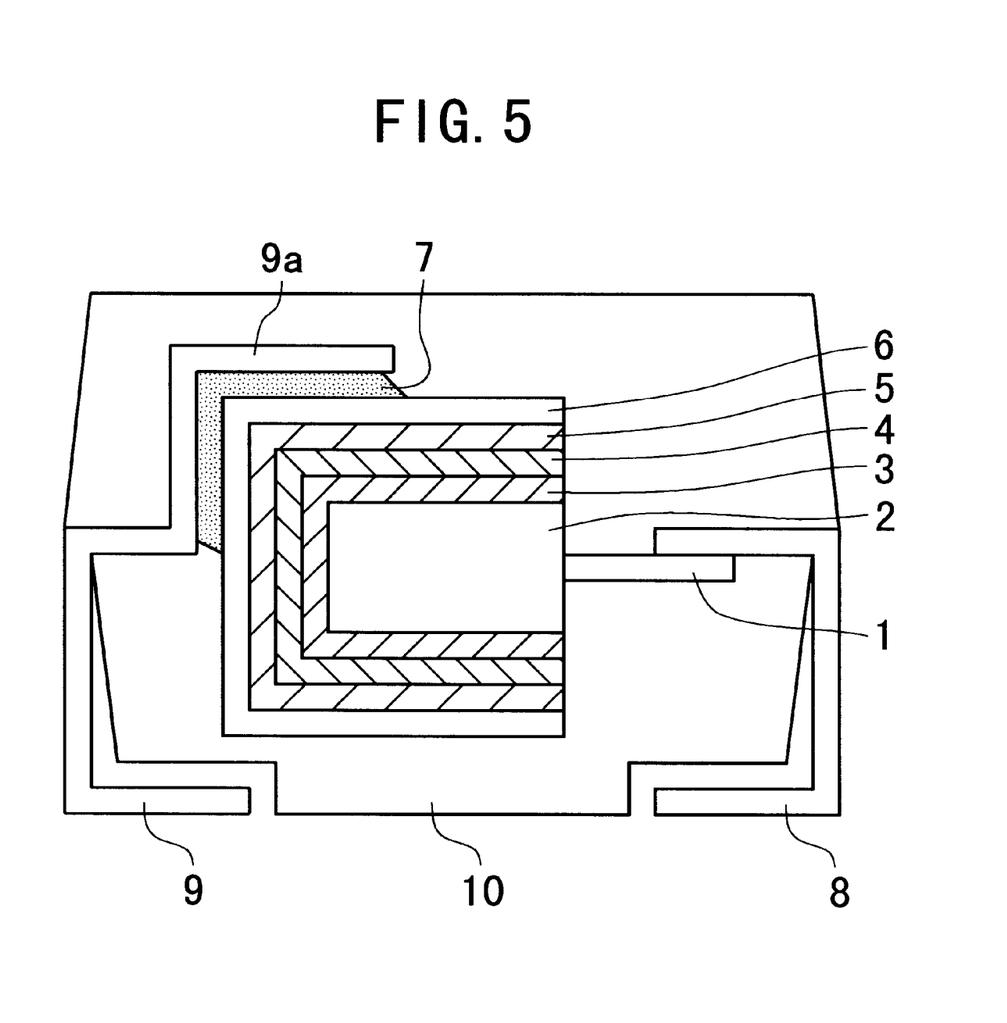
FIG. 5 is a cross-sectional view of a chip-type solid electrolytic capacitor according to the examples of the present invention.

A chip-type solid electrolytic capacitor as shown in FIG. 5 was fabricated.

Figure 4:
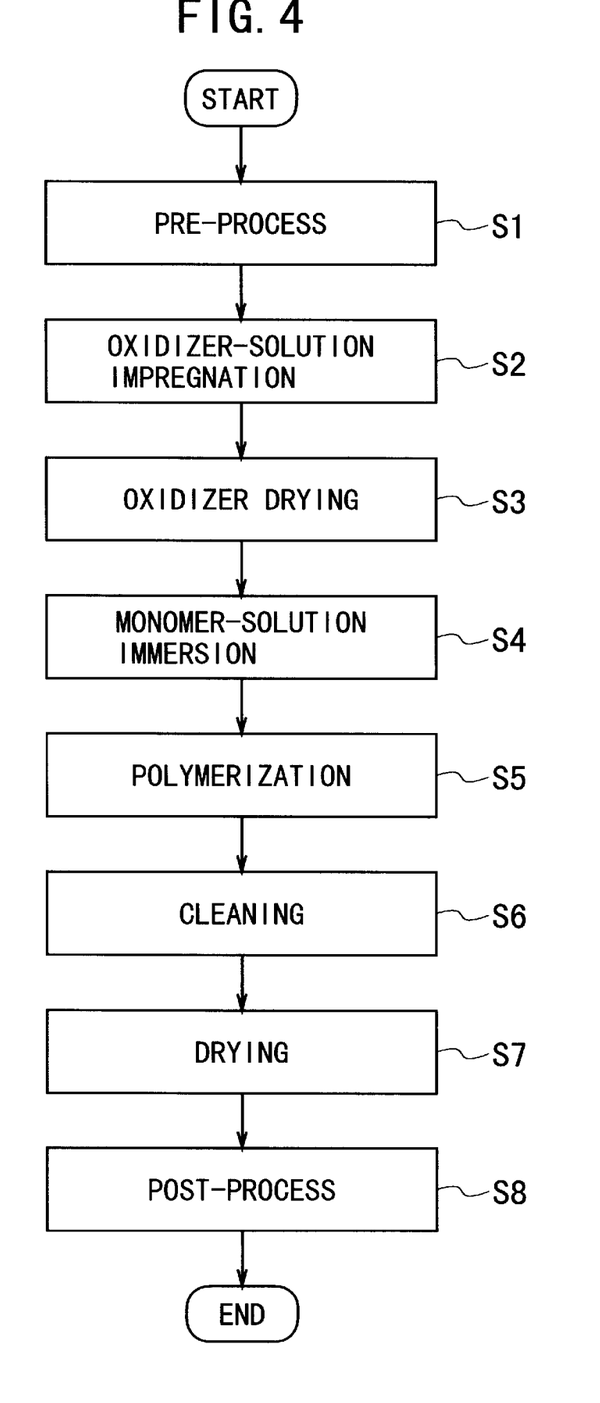
FIG. 4 is a flow chart showing the process sequence of a fabrication method of a solid electrolytic capacitor according to examples of the present invention.

First, as the pre-process in the step S1 in FIG. 4, a porous capacitor body or pellet 2 was made by sintering a powder of tantalum (Ta) The body 2 had an anode wire 1 implanted into the top of the body 2. The vacancy rate of the body was 67%. The body 2 has a cylindrical shape whose diameter and height are 1 mm.

Next, the porous body 2 was subjected to an anodic oxidation by applying a voltage of 15 V in a water solution of phosphoric acid, thereby forming the tantalum oxide layer 3 on the surface of the body 2.

Subsequently, in the step S2, the tantalum anode body 2 with the tantalum oxide layer 3 was immersed into a butanol solution of p-ferric (III) toluenesulfonate serving as an oxidizing agent for 30 seconds. This solution had a viscosity of 200 cp and a concentration of 50 wt %.

In the step S3, the immersed body 2 was into the butanol solution dried at a temperature of 23±3° C. under an atmospheric pressure for 5 minutes.

In the step S4, the dried body 2 was immersed into a liquid-phase pyrrole serving as a monomer for 30 seconds.

In the step S5, the immersed body 2 into pyrrole was subjected to polymerization of the pyrrole adhered to the oxide layer 3 at a temperature of 23±3° C. under an atmospheric pressure for 30 minutes. Thus, a polypyrrole layer 4 serving as the conducting polymer layer was formed on the oxide layer 3.

In the step S6, the polymerized body 2 was cleaned by methanol at a temperature of 23±3° C. under an atmospheric pressure.

In the step S7, the cleaned body 2 was dried at a temperature of 23±3° C. under an atmospheric pressure.

The steps S2 to S7 were repeated six times.

Following this, in the step S8, as the post-process, a graphite layer 5 and a silver paste layer 6 were successively formed on the polypyrrole layer 4 thus formed. An inner end of a cathode lead 9a was attached onto the silver paste layer 6 by an electrically-conductive adhesive 7. An inner end of an anode lead B was welded to the anode wire 1. The porous capacitor body 2, the oxide layer 3, the solid electrolyte layer 4, the electrically-conductive layers 5 and 6, the anode lead 8, and the cathode lead 9 are encapsulated by an epoxy resin package 10 in such a way that outer parts of the anode and cathode leads 8 and 9 protrude from the package 10.

Thus, the solid electrolytic capacitor shown in FIG. 5 was fabricated.

The capacitance, She dielectric tangent (tan δ) at a frequency of 1 kHz, and the Equivalent Series Resistance (ESR) at a frequency of 100 kHz of the capacitor thus fabricated were measured. The result is shown in Table 1.

SECOND EXAMPLE

A solid electrolytic capacitor was fabricated through the same process steps S1 to S8 as those in the first example, except that the butanol solution of p-ferric (III) toluenesulfonate serving as the oxidizing agent had viscosity of 350 cp and a concentration of 60 wt %, and that the steps S2 to S7 were repeated four times.

The capacitance, the tan δ, and the ESR of the capacitor thus fabricated were approximately equal to those of the first example. The result is shown in Table 1.

THIRD EXAMPLE

A solid electrolytic capacitor was fabricated through the same process steps S1 to S8 as those in the first example, except that the butanol solution of p-ferric (III) toluenesulfonate serving as the oxidizing agent had viscosity of 500 cp and a concentration of 50 to 60 wt %, and that the steps S2 to S7 were repeated three times.

The capacitance, the tan δ, and the ESR of the capacitor thus fabricated were approximately equal to those of the first example. The result is shown in Table 1.

FOURTH EXAMPLE

A solid electrolytic capacitor was fabricated through the same process steps S1 to S8 as those in the first example, except that 3,4-ethylenedioxythiophene was used as the monomer instead of pyrrole, and that the steps S2 to S7 were repeated six times.

The capacitance, the tan δ, and the ESR of the capacitor thus fabricated were approximately equal to those of the first example. The result is shown in Table 1.

FIFTH EXAMPLE

A solid electrolytic capacitor was fabricated through the same process steps S1 to S8 as those in the first example, except that 3,4-ethylenedioxythiophene was used as the monomer instead of pyrrole, and that the viscosity of the solution of the oxidizing agent was set as 400 cp, and that the steps S2 to S7 were repeated three times.

The capacitance, the tan δ, and the ESR of the capacitor thus fabricated were approximately equal to those of the first example. The result is shown in Table 1.

SIXTH EXAMPLE

A solid electrolytic capacitor was fabricated through the same process steps S1 to S8 as those in the first example, except that a methanol solution of ferric (III) naphtalenesulfonate with a viscosity of 350 cp was used instead of the butanol solution of p-ferric (III) toluenesulfonate serving as the oxidizing agent, and that 3,4-ethylenedioxythiophene was used as the monomer instead of pyrrole, and that the steps S2 to S7 were repeated four times.

The capacitance, the tan δ, and the ESR of the capacitor thus fabricated were approximately equal to those of the first example. The result is shown in Table 1.

COMPARATIVE EXAMPLE

A solid electrolytic capacitor was fabricated through the same process steps S1 to S8 as those in the first example, except that a methanol solution of ferric (III) dodecylbenzenesulfonate with a viscosity of 150 cp (which is used in the first and second examples of the previously-described conventional methods) was used as the solution of the oxidizing agent, and that and that the steps S2 to S7 were repeated eight times.

TABLE 1

|  | Capacitance [μF] | tan δ [%] | ESR [Ω] |
| --- | --- | --- | --- |
| Example 1 | 9.7 | 4.8 | 0.316 |
| Example 2 | 9.7 | 4.8 | 0.300 |
| Example 3 | 9.6 | 4.9 | 0.290 |
| Example 4 | 9.8 | 4.4 | 0.298 |
| Example 5 | 9.7 | 4.5 | 0.295 |
| Example 6 | 9.7 | 4.6 | 0.328 |
| Comparative Example | 7.3 | 8.1 | 0.549 |

As seen from Table 1, it is found that the capacitance was lower than that of the first example, and the tan δ and the ERR were higher than those of the first example.

As described above, with the fabrication method of a solid electrolyte capacitor according to the present invention, the capacitance characteristics are improved.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A fabrication method of a solid electrolytic capacitor, said method comprising the steps of:

(a) forming a porous capacitor body by a valve metal; said body serving as an anode of said capacitor;

(b) forming an oxide layer of said valve metal to cover a surface of said capacitor body;
said oxide layer serving as a dielectric of said capacitor;

(c) contacting said capacitor body having said oxide layer with a solution of an oxidizing agent to make said solution adhere to said oxide layer at an operating temperature under an operating pressure;
said solution of said oxidizing agent having a viscosity of more than 150 cp to 500 cp at said operating temperature under said operating pressure;

(d) drying said solution of said oxidizing agent adhered to said oxide layer to remove a solvent of said adhered solution and to leave said oxidizing agent on said oxide layer;

said oxidizing agent left on said oxide layer being in solid phase at said operating temperature under said operating pressure;

(e) contacting said capacitor body having said oxide layer with a monomer of a conducting polymer to make said monomer adhere to said oxide layer at said operating temperature under said operating pressure; and (f) polymerizing said monomer of said conducting polymer adhered to said oxide layer by an oxidizing action of said oxidizing agent left on said oxide layer, thereby forming a layer of said conducting polymer on said oxide layer;

wherein said steps (c), (d), (e), and (f) are repeated until a desired thickness of said layer of said conducting polymer is accomplished.

2. A method as claimed in claim 1, wherein said operating temperature is approximately equal to room temperature and said operating pressure is approximately equal to an atmospheric pressure.

3. A method as claimed in claim 1, wherein said operating temperature is in the range of 10 to 30° C. and said operating pressure is in the range of 0.8 to 1.2 atm.

4. A method as claimed in claim 1, wherein said oxidizing agent is a metallic aromatic sulfonate selected from the group consisting of ferric toluenesulfonate, ferric benzenesulfonate, ferric naphthalenesulfonate, and cupric naphthalenesulfonate.

5. A method as claimed in claim 1, wherein said solvent of said oxidizing agent is alcohol.

6. A method as claimed in claim 1, wherein said solvent of said oxidizing agent is one selected from the group consisting of methanol, ethanol, isopropyl alcohol, and butanol.

7. A method as claimed in claim 1, wherein said monomer of said conducting polymer is one selected from the group consisting of pyrrole, thiophene, and aniline and their derivatives.

* * * * *

UNITED STATES PATENT AND TRADEMARK OFFICE
CERTIFICATE OF CORRECTION

PATENT NO. : 6,086,642
DATED : July 11, 2000
INVENTOR(S) : Takashi Fukaumi, et. al.

It is certified that error appears in the above-identified patent and that said Letters Patent is hereby corrected as shown below:

Column 1, line 7, delete "electrolyti" insert --electrolytic--;

line 20, delete "or" insert --of--;

line 23, delete "th" insert --the--;

line 30, delete "electrolte" insert --electrolyte--;

line 41, delete "conuctivity" insert --conductivity--;

line 48, delete "doxide" insert --dioxide--;

line 48, delete "mangnese" insert --manganese--;

line 60, delete "polypyrole" insert --polypyrrole--;

Column 2, line 40, delete "dodecylbezenesulfonate" insert --dodecylbenzenesulfonate--

Column 3, line 4, delete "th" insert --the--

UNITED STATES PATENT AND TRADEMARK OFFICE
CERTIFICATE OF CORRECTION

PATENT NO. : 6,086,642
DATED : July 4, 2000
INVENTOR(S) : Takashi Fukaumi, et. al.

It is certified that error appears in the above-identified patent and that said Letters Patent is hereby corrected as shown below:

Column 3, line 9, delete "polyemrization" insert --polymerization--

Column 4, line 61, delete "dvantages" insert --advantages--

Column 6, line 6, delete "naphthalenesulftnate" insert --naphthalenesulfonate--;

line 43, after "(Ta)" insert --.--

Column 7, line 12, delete "B" insert --the--;

line 21, delete "she" insert --the--

Column 8, line 39, delete "ERR" insert --ESR--

Signed and Sealed this

Twenty-second Day of May, 2001

*Attest:*

NICHOLAS P. GODICI

*Attesting Officer*  Acting Director of the United States Patent and Trademark Office